United States Patent
Lafer et al.

(10) Patent No.: US 11,514,638 B2
(45) Date of Patent: Nov. 29, 2022

(54) 3D ASSET GENERATION FROM 2D IMAGES

(71) Applicant: Roblox Corporation, San Mateo, CA (US)

(72) Inventors: Jared Lafer, Los Angeles, CA (US); Ramsey Jones, Seattle, WA (US); Rebecca Kantar, Truro, MA (US)

( * ) Notice: Subject to any disclaimer, the term of this patent is extended or adjusted under 35 U.S.C. 154(b) by 0 days.

(21) Appl. No.: 17/465,005

(22) Filed: Sep. 2, 2021

(65) Prior Publication Data
US 2022/0068007 A1 Mar. 3, 2022

Related U.S. Application Data

(60) Provisional application No. 63/073,810, filed on Sep. 2, 2020.

(51) Int. Cl.
*G06T 15/04* (2011.01)
*G06T 13/40* (2011.01)
*G06T 17/20* (2006.01)

(52) U.S. Cl.
CPC .............. *G06T 15/04* (2013.01); *G06T 13/40* (2013.01); *G06T 17/20* (2013.01)

(58) Field of Classification Search
CPC ........ A63F 13/61; A63F 13/77; A63F 13/213; A63F 13/65; A63F 13/355; A63F 13/69; B25J 19/023; B25J 9/1602; B25J 9/1697; G06K 9/6271; G06K 9/6201; G06K 9/3241; G06K 9/6202; G06K 9/00671; G06K 9/4609; G06K 9/00201; G06Q 30/0276; G06Q 30/0241; G05B 2219/40563; G05B 2219/40543; G06T 15/04; G06T 13/40; G06T 17/20
See application file for complete search history.

(56) References Cited

U.S. PATENT DOCUMENTS

| 10,748,350 | B1  |   | 2/2020  | Lin                       |
|------------|-----|---|---------|---------------------------|
| 2019/0122411 | A1  | * | 4/2019  | Sachs .................... G06V 20/647 |
| 2019/0304173 | A1  | * | 10/2019 | Chojnowski .............. G06T 7/62 |
| 2019/0313990 | A1  | * | 10/2019 | Sahbaee Bagherzadeh ................ G06V 30/194 |
| 2020/0058137 | A1  | * | 2/2020  | Pujades .................. G06V 40/23 |
| 2021/0248801 | A1  | * | 8/2021  | Li .......................... G06T 17/20 |

(Continued)

OTHER PUBLICATIONS

WIPO, International Search Report for International Patent Application No. PCT/US2021/048812, dated Dec. 9, 2021, 2 pages.
WIPO, Written Opinion for International Patent Application No. PCT/US2021/048812, dated Dec. 9, 2021, 6 pages.

(Continued)

*Primary Examiner* — Abderrahim Merouan
(74) *Attorney, Agent, or Firm* — IP Spring

(57) ABSTRACT

Some implementations relate to methods, systems, and computer-readable media to generate 3D assets from 2D images. In some implementations, a computer-implemented method to generate a 3D asset for an object using a trained machine learning model includes providing a 2D image of the object as input to the trained machine learning model, obtaining a template 3D mesh and a representative of a class of objects of interest that includes the object, generating based on the template 3D mesh and the representative of the class, a rigged 3D mesh for the object, deforming and posing the rigged 3D mesh to match the 2D image, and applying a texture extracted from the 2D image to the deformed and posed 3D mesh to create the 3D asset of the object.

18 Claims, 11 Drawing Sheets

(56) References Cited

U.S. PATENT DOCUMENTS

2022/0068007 A1* 3/2022 Lafer .................. G06T 7/50

OTHER PUBLICATIONS

"CUB Dataset", Retrieved from internet: https://vision.cornell.edu/se3/caltech-ucsd-birds-200/, 2010, 2 pages.
Chang, et al., "ShapeNet: An Information-Rich 3D Model Repository", arXiv preprint arXiv:1512.03012, 2015, 11 pages.
Chen, et al., "DeepLab: Semantic Image Segmentation with Deep Convolutional Nets, Atrous Convolution, and Fully Connected CRFs", IEEE transactions on pattern analysis and machine intelligence 40.4, 2017, pp. 834-848.
Chen, et al., "Learning to Predict 3D Objects with an Interpolation-based Differentiable Renderer", Advances in Neural Information Processing Systems 32, 2019, pp. 9609-9619.
Everingham, et al., "The Pascal Visual Object Classes (VOC) Challenge", Int J Comput Vis (2010) 88, Sep. 9, 2009, pp. 303-338.
Everingham, et al., "The Pascal Visual Object Classes Challenge: A Retrospective", Retrieved from Internet: http://host.robots.ox.ac.uk/pascal/VOC/, Jun. 25, 2014, 39 pages.
Groueix, et al., "AtlasNet: A Papier-Mâché Approach to Learning 3D Surface Generation", arXiv 2018. arXiv preprint arXiv:1802 05384 (1802), 2018, 16 pages.
Kanazawa, et al., "Learning Category-Specific Mesh Reconstruction from Image Collections", Proceedings of the European Conference on Computer Vision (ECCV), 2018, 16 pages.
Ulyanov, et al., "Deep Image Prior", arXiv:1711.10925, Feb. 2020, 23 pages.

\* cited by examiner

INPUT 2D IMAGE    3D PRACTICAL ASSET

3D ASSET GENERATION FROM 2D IMAGES

CROSS-REFERENCE TO RELATED PATENT APPLICATIONS

The present application is a non-provisional of and claims the benefit of priority to U.S. Provisional Application Ser. No. 63/073,810, entitled "PRACTICAL ASSET GENERATION," filed on Sep. 2, 2020, the entire contents of which are hereby incorporated by reference herein.

TECHNICAL FIELD

Implementations relate generally to computer-based assessments and computer-based gaming, and more particularly, to methods, systems, and computer readable media to generate three-dimensional (3D) assets from corresponding two-dimensional (2D) images within a virtual environment.

BACKGROUND

Traditional standardized cognitive assessments primarily evaluate content mastery or domain knowledge, processing speed, and memory. The College Entrance Examination Board, now the College Board, was established in 1923 to define a set of college admission standards through the dissemination of the Scholastic Aptitude Test (SAT). In 1959, the American College Test (ACT) was released as an alternative to the SAT. Both the ACT and the SAT focus on standardized content in mathematics, writing, science, and other subject-specific areas to create objective metrics. While widely adopted across the United States, these assessments reveal little about an individual's specific cognitive abilities or predicted college performance.

In response to the shortcomings in both the methodology and substance of traditional standardized college admissions tests, employers have adopted other traditional cognitive ability or intelligence tests in an effort to glean more predictive insights on applicants' cognitive profiles. These assessments focus on content mastery or domain knowledge, processing speed, memory, as well as capabilities required by the 21st-century workforce. The assessments can include displays of visual representation of real-life objects such as vehicles, planes as well as biological assets that set a baseline scenario for the assessee.

Some online platforms (e.g., online virtual experience platforms, media exchange platforms, etc.) utilize visual representations of objects. Online virtual experience platforms allow users to connect with each other, interact with each other (e.g., within a virtual environment), create virtual experiences and games, and share information with each other via the Internet. Users of online virtual experience platforms may participate in multiplayer gaming environments or virtual environments (e.g., three-dimensional environments), design custom environments, design characters or objects, design mechanisms, exchange virtual items/objects with other users, communicate with other users using audio or text messaging, and so forth. Users may interact with objects within the virtual environment, and simulation of the objects may be performed within the virtual environment. Simulation of objects within the virtual environment may utilize representations of a variety of objects, which may then be displayed on one or more user device(s). Some implementations were conceived in light of the above.

SUMMARY

Aspects of this disclosure are directed to methods, systems, and computer readable media to generate three-dimensional (3D) assets from corresponding two-dimensional (2D) images, for example, within a virtual environment.

According to one aspect, a computer-implemented method is disclosed to generate a 3D asset of an object using a trained machine learning model, the method comprising: providing a two-dimensional (2D) image of the object as input to the trained machine learning model; obtaining a template three-dimensional (3D) mesh and a representative of a class of objects of interest that includes the object; generating, using the trained machine learning model, based on the template 3D mesh and the representative of the class, a rigged 3D mesh for the object; deforming and posing the rigged 3D mesh to match the 2D image; and applying a texture extracted from the 2D image to the deformed and posed 3D mesh to create the 3D asset of the object.

Various implementations of the method are disclosed.

In some implementations, the method further comprises: displaying a user interface that includes the 3D asset; and receiving user input to adjust at least one graphical feature of the 3D asset.

In some implementations, the method further comprises: iteratively generating rigged 3D meshes based on a sequence of 2D images of the object; and generating an animation of the 3D asset based on the iteratively generated 3D meshes.

In some implementations, the method further comprises: determining a category of the object based on the 2D image using a trained neural network, wherein the obtaining the representative of the class of objects of interest is based on the determined category.

In some implementations, applying the texture comprises: generating a mapping from two or more vertices of the rigged 3D mesh of the object to the 2D image based on the 2D image and the rigged 3D mesh of the object, wherein the mapping is used to apply the texture to the deformed and posed 3D mesh of the object.

In some implementations, generating the mapping is performed by a UV regressor trained using a loss function that includes one or more of: a descriptor loss based on a Chamfer distance or a color loss.

In some implementations, the trained machine learning model is a first trained machine learning model, and wherein the deforming and posing comprises: generating, using a second trained machine learning model, a vector field for the rigged 3D mesh based on the 2D image and the rigged 3D mesh of the object; predicting a plurality of bone rotations and transformations of the rigged 3D mesh using the vector field; and generating an alpha image based on the predicted plurality of bone rotations and transformations.

In some implementations, the method further comprises: comparing the alpha image to the 2D image using a loss function that includes one or more of: a descriptor loss, a silhouette loss, or a symmetry loss.

In some implementations, the deforming and posing comprises one or more of: determining a displacement of the vertices of the rigged 3D mesh to match the 2D image; determining one or more of a translation or rotation to be applied to the rigged 3D mesh to match the 2D image; or determining a predicted bone affine transformation to be applied to the rigged 3D mesh to match a pose of the object in the 2D image.

According to another aspect, a system is disclosed that comprises a memory with instructions stored thereon; and a processing device, coupled to the memory, the processing device configured to access the memory, wherein the instructions when executed by the processing device, cause the processing device to perform operations including: obtaining a two-dimensional (2D) image of an object;

obtaining a template three-dimensional (3D) mesh and a representative of a class of objects of interest that includes the object; generating, using a trained machine learning model and based on the template 3D mesh and the representative of the class, a rigged 3D mesh for the object; deforming the rigged 3D mesh to match the 2D image; and applying a texture extracted from the 2D image to the deformed and posed 3D mesh to create the 3D asset.

Various implementations of the system are disclosed.

In some implementations, the operations further comprise: displaying a user interface that includes the 3D asset; and receiving user input to adjust at least one graphical feature of the 3D asset.

In some implementations, the operations further comprise: iteratively generating rigged 3D meshes based on a sequence of 2D images of the object; and generating an animation of the 3D asset based on the iteratively generated rigged 3D meshes.

In some implementations, the operations further comprise: determining a category of the object based on the 2D image using a trained neural network, wherein the obtaining the representative of the class of objects of interest is based on the determined category.

In some implementations, applying the texture comprises: generating a mapping from two or more vertices of the rigged 3D mesh of the object to the 2D image based on the 2D image and the rigged 3D mesh of the object, wherein the mapping is used to apply the texture to the deformed 3D mesh of the object.

In some implementations, the trained machine learning model is a first trained machine learning model, and wherein the deforming comprises: generating, using a second trained machine learning model, a vector field for the rigged 3D mesh based on the 2D image and the rigged 3D mesh of the object; predicting a plurality of bone rotations and transformations of the rigged 3D mesh using the vector field; and generating an alpha image based on the predicted plurality of bone rotations and transformations.

In some implementations, the operations further comprise: comparing the alpha image to the 2D image using a loss function that includes one or more of: a descriptor loss, a silhouette loss, or a symmetry loss.

In some implementations, the deforming comprises one or more of: determining a displacement of the vertices of the rigged 3D mesh to match the 2D image; determining one or more of a translation or rotation to be applied to the rigged 3D mesh to match the 2D image; or determining a predicted bone affine transformation to be applied to the rigged 3D mesh to match a pose of the object in the 2D image.

According to another aspect, a non-transitory computer-readable medium is provided that comprises instructions that, responsive to execution by a processing device, causes the processing device to perform operations comprising: providing a two-dimensional (2D) image of an object as input to a trained machine learning model; obtaining a template three-dimensional (3D) mesh and a representative of a class of objects of interest that includes the object; generating, using the trained machine learning model, based on the template 3D mesh and the representative of the class, a rigged 3D mesh for the object; deforming and posing the rigged 3D mesh to match the 2D image; and applying a texture extracted from the 2D image to the deformed and posed 3D mesh to create the 3D asset of the object.

Various implementations of the non-transitory computer-readable medium are disclosed.

In some implementations, mapping the texture comprises: generating, using a UV regressor, a mapping from two or more vertices of the rigged 3D mesh of the object to the 2D image based on the 2D image and the rigged 3D mesh of the object, wherein the mapping is used to apply the texture to the deformed and posed 3D mesh of the object.

In some implementations, the deforming and posing comprises one or more of: determining a displacement of the vertices of the rigged 3D mesh to match the 2D image; determining one or more of a translation or rotation to be applied to the rigged 3D mesh to match the 2D image; or determining a predicted bone affine transformation to be applied to the rigged 3D mesh to match a pose of the object in the 2D image.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
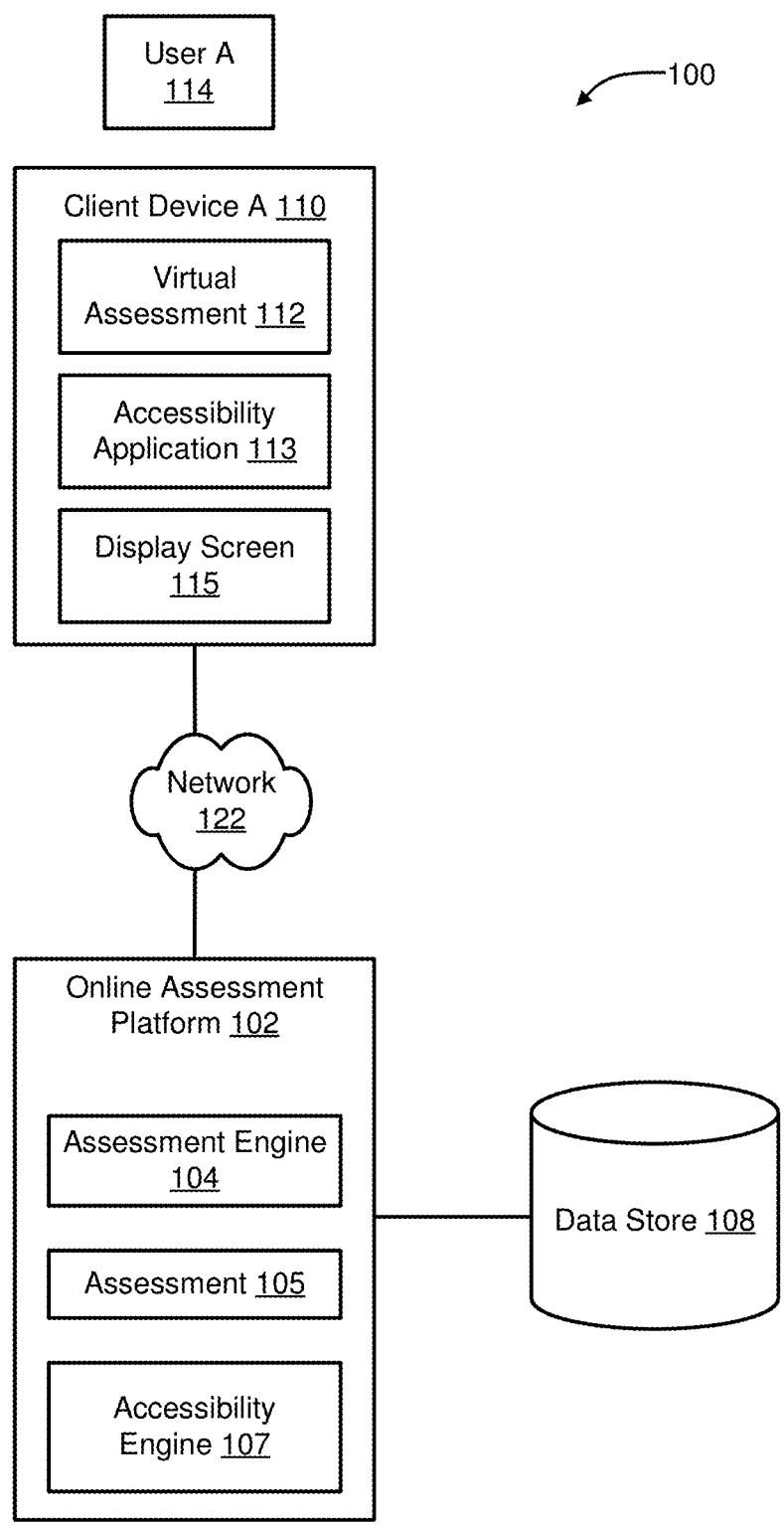
FIG. 1 is a diagram of an example network environment, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

In some aspects, systems and methods are provided for creating 3D assets from target or input 2D images. The 3D assets may be deformable, poseable, and used to create 3D animations. The 3D assets may be usable to render a virtual 3D object in a 3D virtual environment, such as a virtual experience (e.g., a concert, a meeting, etc.) and/or a game. In some implementations, the 3D virtual environment may be a metaverse.

The 3D assets may also be referred to as "practical assets," as the generated assets are "practical" (e.g., have a low cost of generation, can be generated with very little training data, have a low computational cost, support arbitrary objects as long as a class representative is available, etc.). Furthermore, the generated 3D assets include mesh and texture, and can be posed/deformed/animated arbitrarily, thereby easily being utilized within 3D environments and online virtual experiences.

In some implementations, the creation of 3D assets may be allocated as a portion of an evaluation and/or assessment of a person. The creation of 3D assets may also be allocated as a portion of an automated methodology to create 3D assets for use within online virtual experience platforms, which may include games, environments, scenarios, and/or virtual assessments.

Online virtual experience platforms (also referred to as "user-generated content platforms" or "user-generated content systems") offer a variety of ways for users to interact with one another. For example, users of an online virtual experience platform may work together towards a common goal, share various virtual items/objects, send electronic messages to one another, and so forth. Users of an online virtual experience platform may join scenarios or virtual experiences as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

The online virtual experience platform may also support use of virtual objects that mimic physical objects (rigid body objects) within a virtual environment. For example, the online virtual experience platform may enable users to design and introduce various categories of virtual objects, e.g., vehicles, weapons and weapon accessories, toys, structures, etc. These objects may be viewed by one or more users within a virtual environment supported by the online virtual experience platform. For example, motion of such objects within the virtual environment may be displayed on user devices.

An online virtual experience platform may also allow users (developers) of the platform to create new objects and/or mechanisms. For example, users of the online virtual experience platform may be enabled to create, design, and/or customize new objects such as vehicles, tools, toys, and make them available to other users.

The online virtual experience platform (also referred to as a game or gaming platform) may provide tools to support simulation of objects and mechanisms within a virtual environment. In some implementations, a rendering engine, physics engine and/or physics solver may be utilized for the simulation of objects.

Some objects and/or parameters within a virtual environment may be such that the complexity of simulating the objects and environment may be computationally expensive to enable the simulation to meet time requirements for real-time simulation and rendering of the object. For example, a representation of a novel object may have to be performed within a time period that meets requirements for a particular frame refresh rate of a display device. Failure to meet the time requirement can lead to jittery updates, leading to a poor visual experience for the user.

An objective of a virtual experience platform owner or administrator is superior user experience for its users. A technical problem for online virtual experience platform operators is accurate, timely, and computationally efficient generation of 3D object representations that are usable within a virtual environment.

Techniques are described for the use of a homeomorphic template mesh as a single parametrization within a machine learning (ML) model framework to generate 3D assets based on deformation of template 3D meshes. The geometry of the template serves as a prior that can ease the learning problem and enable training of machine learning models even when limited training data is available. Per techniques described herein, through the training, the ML model implicitly learns the geometry correlations of portions of objects. In the case of rigged templates, the deformed template can inherit that rig thus enabling efficient transfer of animations based on the rig to various objects.

Providing variation in the distinct views and scenes for different versions of scenarios and providing assets that are realistic can be time-consuming to create from scratch and/or prohibitively expensive to purchase. In some embodiments, in order to provide a scalable approach to generate distinct views and scenes for different versions of scenarios, the system generates assets using 2D to 3D reconstruction, or taking a single image as an input and representing the object of interest in three-dimensional space as the output.

For example, prior approaches for 3D surface generation, such as AtlasNet, which is composed of a union of learnable parameterizations, may be used. These learnable parameterizations may transform a set of 2D squares to the surface. The parameters of the transformations may come both from the learned weights of a neural network and a learned representation of the shape. For example, the learned parametric transformation may map locally everywhere to a surface, naturally adapt to its underlying complexity, be sampled at any desired resolution, and allow for the transfer of a texture map to the generated surface.

Three-dimensional reconstruction involving meshes for objects, e.g., fish, mammals, etc., poses a challenge. To address these shortcomings, in some implementations, a template mesh is used as the domain of parameterization, such as a homeomorphic template mesh. This homeomorphic function is a one-to-one mapping between sets such that both the function and its inverse are continuous and that in topology exists for geometric figures which can be transformed one into the other by an elastic deformation. The geometry of the template mesh may serve as a prior that significantly eases the learning process, particularly in instances where limited training data is available.

For example, the neural network may implicitly learn geometrical correlations such that, e.g., fins for a fish in the template mesh align with fins for a fish in an input image. If the template mesh was animated by rigging, the template mesh may inherit that animation even after it has been deformed. Rigging is a technique in animation for representing a 3D model using a series of interconnected digital bones. Specifically, rigging refers to the process of creating the bone structure of the 3D model. For example, a 3D model where a deer has been deformed into a horse may inherit the deer's animation.

By automatically generating objects (e.g., 3D assets) for virtual experiences, such as biological assets, costs associated with a traditional art and animation team may be reduced. Further, because it may take some time to generate assets, there is no latency if they are precomputed. In some embodiments, generated assets may be enhanced offline by an artist to ensure that they look realistic. In some embodiments, the asset generation pipeline may be used to generate an asset from a stock image, for which there is neither multiple perspectives of the same image nor perspective consistency between images. In some embodiments, multiple input images may be used to leverage the information from having full perspective coverage and/or a sequence of multiple input images may be used to create a useful, immersive animation for any online virtual experience, including games, linked environments, and/or a metaverse.

Accordingly, the described systems and methods provide for one or more trained machine learning models to generate a three-dimensional reconstruction as a useable and practical 3D asset, from one or more two-dimensional images of an object.

FIG. 1 is a diagram of an example network environment for computer-based assessment, in accordance with some implementations. FIG. 1 illustrates an example network environment 100, in accordance with some implementations of the disclosure. The network environment 100 (also referred to as "system" herein) includes an online assessment platform 102, and a client device 110 (or multiple client devices), all connected via a network 122. The online assessment platform 102 can include, among other things, an assessment engine 104, one or more assessments 105, an accessibility engine 107, and a data store 108. The client device 110 can include a virtual assessment 112, an accessibility application 113, and a display screen 115, to interact with the online assessment platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online assessment platform 102 can include a server having one or more computing devices (e.g., a cloud computing system, a rackmount server, a server computer, cluster of physical servers, virtual server, etc.). In some implementations, a server may be included in the online assessment platform 102, be an independent system, or be part of another system or platform.

In some implementations, the online assessment platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online assessment platform 102 and to provide to a user (e.g., user 114 via client device 110) with access to online assessment platform 102. The online assessment platform 102 may also include a website (e.g., one or more web pages) or application back-end software that may be used to provide a user with access to content provided by online assessment platform 102. For example, users (or proctors) may access online assessment platform 102 using the accessibility application 113 on client device 110, respectively.

In some implementations, online assessment platform 102 may provide connections between one or more assessment providers and/or employers that allows proctors (e.g., the persons administering an assessment) to communicate with other proctors via the online assessment platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., testing or assessment user) being an entity controlled by a set of users or a group being assessed as to work skills and communication skills. For example, a set of individual users federated as a group being assessed may be considered a "user," in some circumstances.

In some implementations, online assessment platform 102 may include digital asset and digital assessment generation provisions. For example, the platform may provide administrator interfaces allowing the design, modification, unique tailoring for individuals, and other modification functions. In some implementations, assessments may include two-dimensional (2D) games, three-dimensional (3D) games, virtual reality (VR) games, or augmented reality (AR) games, for example. In some implementations, assessment creators and/or proctors may search for assessments, combine portions of assessments, tailor assessments for particular activities (e.g., group assessments), and other features provided through the assessment platform 102.

In some implementations, online assessment platform 102 or client device 110 may include the assessment engine 104 or virtual assessment 112. In some implementations, assessment engine 104 may be used for the development or execution of assessments 105. For example, assessment engine 104 may include a rendering engine ("renderer") for 2D, 3D, VR, or AR graphics, a physics engine, a collision detection engine (and collision response), sound engine, scripting functionality, haptics engine, artificial intelligence engine, networking functionality, streaming functionality, memory management functionality, threading functionality, scene graph functionality, or video support for cinematics, among other features. The components of the assessment engine 104 may generate commands that help compute and render the assessment (e.g., rendering commands, collision commands, physics commands, etc.).

The online assessment platform 102 using assessment engine 104 may perform some or all the assessment engine functions (e.g., generate physics commands, rendering commands, etc.), or offload some or all the assessment engine functions to assessment engine 104 of client device 110 (not illustrated). In some implementations, each assessment 105 may have a different ratio between the assessment engine functions that are performed on the online assessment platform 102 and the assessment engine functions that are performed on the client device 110.

In some implementations, assessment instructions may refer to instructions that allow a client device 110 to render gameplay, graphics, and other features of an assessment, such as a natural world rendering having a logical problem represented therein. The instructions may include one or more of user input (e.g., physical object positioning), character position and velocity information, or commands (e.g., physics commands, rendering commands, collision commands, etc.). The instructions may be audibly prompted by an assessment proctor, audibly presented by a speech synthesizer, physically represented by haptic feedback (e.g., vibration at borders, misalignment, etc.), or a combination of the same.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online assessment platform 102 at any given moment. It may be noted that the number of client devices 110 is provided as illustration, rather than limitation. In some implementations, any number of client devices 110 may be used.

In some implementations, each client device 110 may include an instance of the virtual assessment 112. The virtual assessment 112 may be representative of an educational assessment examination, a vocational assessment examination, or any suitable assessment, whether standardized or uniquely tailored to a particular individual or group of individuals. In at least one implementation, the platform 100 may be configured to utilize and/or create 3D assets for an assessment and/or use in a virtual environment.

Figure 2:
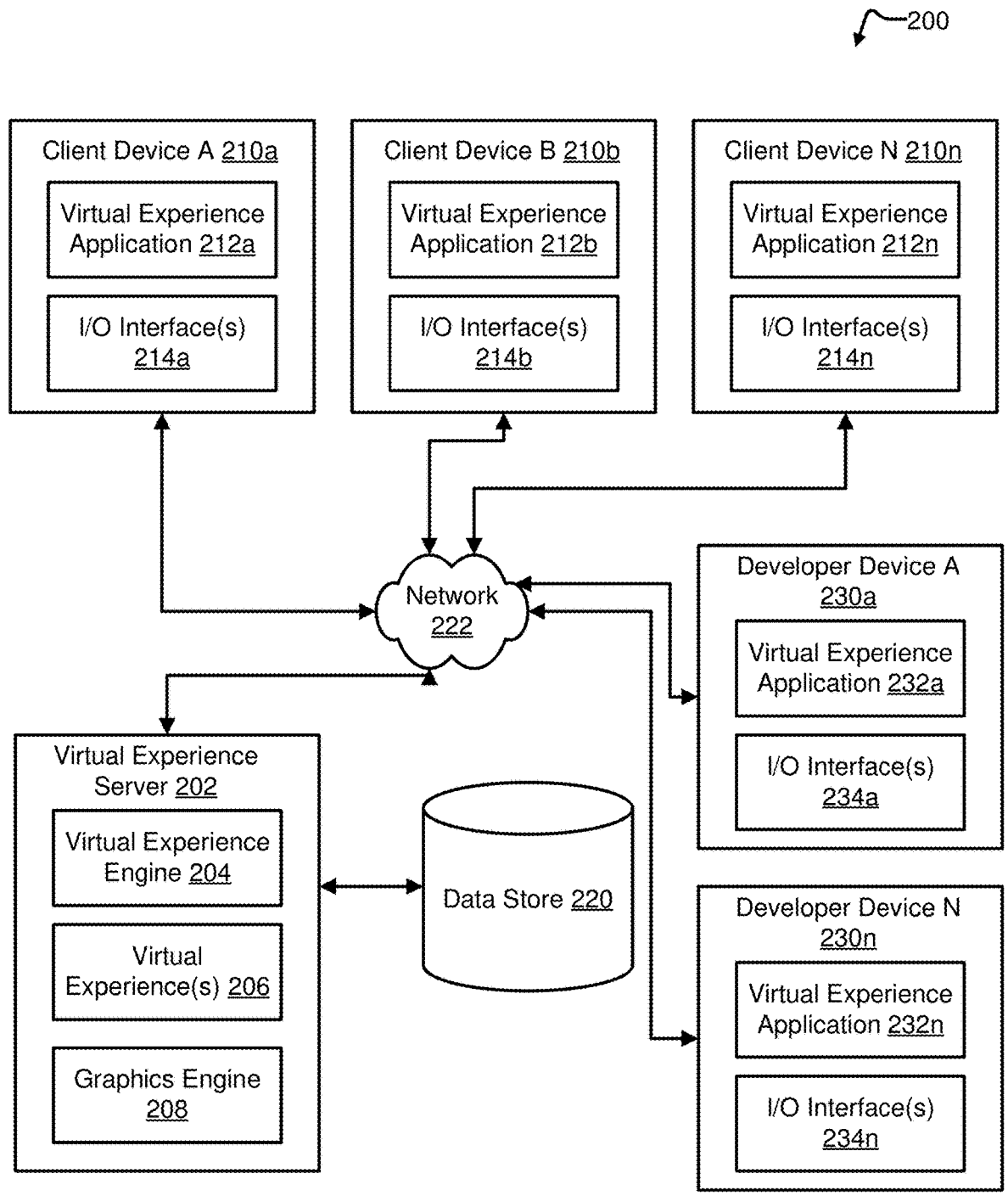
FIG. 2 is a diagram of an example system architecture to generate 3D assets of objects from 2D images, in accordance with some implementations.

FIG. 2 is a diagram of an example system architecture to generate 3D assets from 2D images in an online virtual experience context, in accordance with some implementations. FIG. 2 and the other figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral (e.g. "210" in the text refers to reference numerals "210a," "210b," and/or "210n" in the figures).

The system architecture 200 (also referred to as "system" herein) includes online virtual experience server 202, data store 220, client devices 210a, 210b, and 210n (generally referred to as "client device(s) 210" herein), and developer devices 230a and 230n (generally referred to as "developer device(s) 230" herein). Online virtual experience server 202, data store 220, client devices 220, and developer devices 230 are coupled via network 122. In some implementations, client devices(s) 210 and developer device(s) 230 may refer to the same or same type of device.

Online virtual experience server 202 can include, among other things, a virtual experience engine 204, one or more virtual experience(s) 206, and graphics engine 208. In some implementations, the graphics engine 208 may be a system, application, or module that permits the online virtual experience server 202 to provide graphics and animation capability. In some implementations, the graphics engine 208 may perform one or more of the operations described below in connection with the flowchart shown in FIG. 3 or FIG. 4, or the process described with reference to FIGS. 6A-6G. A client device 210 can include a virtual experience application 212, and input/output (I/O) interfaces 214 (e.g., input/output devices). The input/output devices can include one or more of a microphone, speakers, headphones, display device, mouse, keyboard, game controller, touchscreen, virtual reality consoles, etc.

A developer device 230 can include a virtual experience application 232, and input/output (I/O) interfaces 234 (e.g., input/output devices). The input/output devices can include one or more of a microphone, speakers, headphones, display device, mouse, keyboard, game controller, touchscreen, virtual reality consoles, etc.

System architecture 200 is provided for illustration. In different implementations, the system architecture 200 may include the same, fewer, more, or different elements configured in the same or different manner as that shown in FIG. 2.

In some implementations, network 222 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 220 may be a non-transitory computer readable memory (e.g., random access memory), a cache, a drive (e.g., a hard drive), a flash drive, a database system, or another type of component or device capable of storing data. The data store 220 may also include multiple storage components (e.g., multiple drives or multiple databases) that may also span multiple computing devices (e.g., multiple server computers). In some implementations, data store 220 may include cloud-based storage.

In some implementations, the online virtual experience server 202 can include a server having one or more computing devices (e.g., a cloud computing system, a rackmount server, a server computer, cluster of physical servers, etc.). In some implementations, the online virtual experience server 202 may be an independent system, may include multiple servers, or be part of another system or server.

In some implementations, the online virtual experience server 202 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 202 and to provide a user with access to online virtual experience server 202. The online virtual experience server 202 may also include a website (e.g., a web page) or application back-end software that may be used to provide a user with access to content provided by online virtual experience server 202. For example, users may access online virtual experience server 202 using the virtual experience application 212 on client devices 210.

In some implementations, session data (e.g., such as gaming session data, or virtual experience session data) are generated via online virtual experience server 202, virtual experience application 212, and/or virtual experience application 232, and are stored in data store 220. With permission from virtual experience players, session data may include associated metadata, e.g., virtual experience identifier(s); device data associated with the players; demographic information of the player(s); virtual experience session identifier(s); chat transcripts; session start time, session end time, and session duration for each player; relative locations of participant avatar(s) within a virtual environment; in-game purchase(s) by one or more player(s); accessories utilized by players; etc.

In some implementations, online virtual experience server 202 may be a virtual gaming server. For example, the gaming server may provide single-player or multiplayer games to a community of users that may access or interact with games using client devices 210 via network 222. In some implementations, games (also referred to as "video game," "virtual experiences," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game. In other implementations, games may be embedded within virtual environments as part of a rich, immersive online virtual experience.

In some implementations, gameplay or "virtual sessions" may refer to the interaction of one or more players using client devices (e.g., 210) within a virtual experience (e.g., 206) or the presentation of the interaction on a display or other output device (e.g., 214) of a client device 210.

In some implementations, a virtual experience 206 can include an electronic file that can be executed or loaded using software, firmware or hardware configured to present the virtual experience content (e.g., digital media item) to an entity. In some implementations, a virtual experience application 212 may be executed and a virtual experience 206 rendered in connection with a virtual experience engine 204. In some implementations, a virtual experience 206 may have a common set of rules or common goal, and the environment of a virtual experience 206 share the common set of rules or common goal. In some implementations, different virtual experiences may have different rules or goals from one another. In still other implementations, virtual experiences and games may be melded such that gameplay is part of a virtual experience, although not necessarily being a requirement for enjoying the virtual experience.

In some implementations, online games and virtual experiences may have one or more environments (also referred to as "gaming environments" or "virtual environments" herein) where multiple environments may be linked. An example of an environment may be a three-dimensional (3D) environment. The one or more environments of a virtual experience 206 may be collectively referred to as a "world" or "gaming world" or "virtual world" or "universe" or "metaverse" herein. An example of a world may be a 3D world of a virtual experience 206. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 202 can host one or more virtual experiences 206 and can permit users to interact with the virtual experiences 206 using a virtual experience application 212 of client devices 210. Users of the online virtual experience server 202 may play, create, interact with, or build games and/or virtual experiences 206, communicate with other users, and/or create and build objects (e.g., also referred to as "item(s)" or "game objects" or "virtual item(s)" herein) of virtual experience 206.

For example, in generating user-generated virtual items, users may create characters, decoration for the characters, one or more virtual environments for an interactive game, or build structures used in a virtual experience 206, among others. In some implementations, users may buy, sell, or trade game virtual objects, such as in-platform currency (e.g., virtual currency), with other users of the online virtual experience server 202. In some implementations, online virtual experience server 202 may transmit virtual content to virtual experience applications (e.g., 212). In some implementations, virtual content (also referred to as "game content" or "content" herein) may refer to any data or software instructions (e.g., virtual objects, game(s), user information, video, image(s), command(s), media item(s), etc.) associated with online virtual experience server 202 or other game applications. In some implementations, virtual objects (e.g., also referred to as "item(s)" or "objects" or "game objects" or "virtual game item(s)" herein) may refer to objects that are used, created, shared or otherwise depicted in virtual experience applications 206 of the online virtual experience server 202 or virtual experience applications 212 of the client devices 210. For example, virtual objects may include a part, model, character, accessories, tools, weapons, clothing, buildings, vehicles, currency, flora, fauna, components of the aforementioned (e.g., windows of a building), and so forth.

In some implementations, a virtual experience 206 may be associated with a particular user or a particular group of users (e.g., a private experience or world), or made widely available to users with access to the online virtual experience server 202 (e.g., a public experience or world). In some implementations, where online virtual experience server 202 associates one or more virtual experience 206 with a specific user or group of users, online virtual experience server 202 may associate the specific user(s) with a virtual experience 206 using user account information (e.g., a user account identifier such as username and password).

In some implementations, online virtual experience server 202 or client devices 210 may include a virtual experience engine 204 or virtual experience application 212. In some implementations, virtual experience engine 204 may be used for the development or execution of virtual experience 206. For example, virtual experience engine 204 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 204 may generate commands that help compute and render the virtual environment (e.g., rendering commands, collision commands, physics commands, etc.). In some implementations, virtual experience applications 212 of client devices 210/216, respectively, may work independently, in collaboration with virtual experience engine 204 of online virtual experience server 202, or a combination of both.

In some implementations, both the online virtual experience server 202 and client devices 210 may execute a virtual experience engine (204 and 212, respectively). The online virtual experience server 202 using virtual experience engine 204 may perform some or all the virtual experience engine functions (e.g., generate physics commands, rendering commands, etc.), or offload some or all the virtual experience engine functions to virtual experience engine 204 of client device 210. In some implementations, each virtual experience 206 may have a different ratio between the virtual experience engine functions that are performed on the online virtual experience server 202 and the virtual experience engine functions that are performed on the client devices 210. For example, the virtual experience engine 204 of the online virtual experience server 202 may be used to generate physics commands in cases where there is a collision between at least two virtual objects, while the additional virtual experience engine functionality (e.g., generate rendering commands) may be offloaded to the client device 210. In some implementations, the ratio of virtual experience engine functions performed on the online virtual experience server 202 and client device 210 may be changed (e.g., dynamically) based on gameplay conditions. For example, if the number of users participating in gameplay of a particular virtual experience 206 exceeds a threshold number, the online virtual experience server 202 may perform one or more virtual experience engine functions that were previously performed by the client devices 210.

For example, users may be engaging with a virtual experience 206 on client devices 210, and may send control instructions (e.g., user inputs, such as right, left, up, down, user election, or character position and velocity information, etc.) to the online virtual experience server 202. Subsequent to receiving control instructions from the client devices 210, the online virtual experience server 202 may send gameplay instructions (e.g., position and velocity information of the characters participating in the group gameplay or commands, such as rendering commands, collision commands, etc.) to the client devices 210 based on control instructions. For instance, the online virtual experience server 202 may perform one or more logical operations (e.g., using virtual experience engine 204) on the control instructions to generate gameplay instruction(s) for the client devices 210. In other instances, online virtual experience server 202 may pass one or more or the control instructions from one client device 210 to other client devices (e.g., from client device 210a to client device 210b) participating in the virtual experience 206. The client devices 210 may use the gameplay instructions and render the gameplay for presentation on the displays of client devices 210. It is noted that although described as "gameplay" for the purposes of discussion, some virtual experiences do not include traditional games or require traditional "play."

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 202. In other implementations, the control instructions may be sent from a client device 210 to another client device (e.g., from client device 210b to client device 210n), where the other client device generates gameplay instructions using the local virtual experience engine 204. The control instructions may include instructions to play a voice communication message or other sounds from another user on an audio device (e.g., speakers, headphones, etc.), for example voice communications or other sounds generated.

In some implementations, gameplay instructions may refer to instructions that enable a client device 210 to render gameplay of a virtual experience, such as a multiplayer game or virtual experience in a virtual world. The gameplay instructions may include one or more of user input (e.g., control instructions), character position and velocity information, or commands (e.g., physics commands, rendering commands, collision commands, etc.).

In some implementations, characters (or virtual objects generally) are constructed from components, one or more of which may be selected by the user, that automatically join together to aid the user in editing. In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc. One or more characters (also referred to as an "avatar" or "model" herein) may be associated with a user where the user may control the character to facilitate a user's interaction with the virtual experience 206.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, a component, such as a body part, may be a primitive geometrical shape such as a block, a cylinder, a sphere, etc., or some other primitive shape such as a wedge, a torus, a tube, a channel, etc. In some implementations, a component may be a biological asset, such as a mammal, fish, or bird. In some implementations, a creator module may publish a user's character for view or use by other users of the online virtual experience server 202. In some implementations, creating, modifying, or customizing characters, other virtual objects, virtual experience 206, or virtual environments may be performed by a user using a I/O interface (e.g., developer interface) and with or without scripting, or with or without an application programming interface (API). It may be noted that for purposes of illustration, characters are described as having a humanoid form. It may further be noted that characters may have any form such as a vehicle, animal, inanimate object, or other creative form.

In some implementations, the online virtual experience server 202 may store characters created by users in the data store 220. In some implementations, the online virtual experience server 202 maintains a character catalog and game/experience catalog that may be presented to users. In some implementations, the game/experience catalog includes images of virtual experiences stored on the online virtual experience server 202. In addition, a user may select a character (e.g., a character created by the user or other user) from the character catalog to participate in the chosen game or virtual experience. The character catalog includes images of characters stored on the online virtual experience server 202. In some implementations, one or more of the characters in the character catalog may have been created or customized by the user. In some implementations, the chosen character may have character settings defining one or more of the components of the character.

In some implementations, the client device(s) 210 may each include computing devices such as personal computers (PCs), mobile devices (e.g., laptops, mobile phones, smart phones, tablet computers, or netbook computers), network-connected televisions, gaming consoles, etc. In some implementations, a client device 210 may also be referred to as a "user device." In some implementations, one or more client devices 210 may connect to the online virtual experience server 202 at any given moment. It may be noted that the number of client devices 210 is provided as illustration. In some implementations, any number of client devices 210 may be used.

In some implementations, each client device 210 may include an instance of the virtual experience application 212, respectively. In one implementation, the virtual experience application 212 may permit users to use and interact with online virtual experience server 202, such as control a virtual character in a virtual world hosted by online virtual experience server 202, or view or upload content, such as virtual experience 206, games, virtual objects, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, VR application, AR application, or a gaming program) that is installed and executes local to client device 210 and allows users to interact with online virtual experience server 202. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an online virtual experience server application for users to build, create, edit, upload content to the online virtual experience server 202 as well as interact with online virtual experience server 202 (e.g., engage with virtual experiences 206 hosted by online virtual experience server 202). As such, the virtual experience application may be provided to the client device(s) 210 by the online virtual experience server 202. In another example, the virtual experience application may be an application that is downloaded from a server.

In some implementations, each developer device 230 may include an instance of the virtual experience application 232, respectively. In one implementation, the virtual experience application 232 may permit a developer user(s) to use and interact with online virtual experience server 202, such as control a virtual character in a virtual experience hosted by online virtual experience server 202, or view or upload content, such as virtual experience 206, games, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 230 and allows users to interact with online virtual experience server 202. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 232 may be an online virtual experience server application for developers to build, create, edit, upload content to the online virtual experience server 202 as well as interact with online virtual experience server 202 (e.g., provide and/or play virtual experience 206 hosted by online virtual experience server 202). As such, the virtual experience application may be provided to the client device(s) 230 by the online virtual experience server 202. In another example, the virtual experience application 232 may be an application that is downloaded from a server. Virtual experience application 232 may be configured to interact with online virtual experience server 202 and obtain access to user credentials, user currency, etc. for one or more virtual experiences 206 developed, hosted, or provided by a game developer.

In general, functions described in one implementation as being performed by the online virtual experience server 202 can also be performed by the client device(s) 210, or a server, in other implementations if appropriate. In addition, the functionality attributed to a particular component can be performed by different or multiple components operating together. The online virtual experience server 202 can also be accessed as a service provided to other systems or devices through appropriate application programming interfaces (APIs), and thus is not limited to use in websites.

Figure 3:
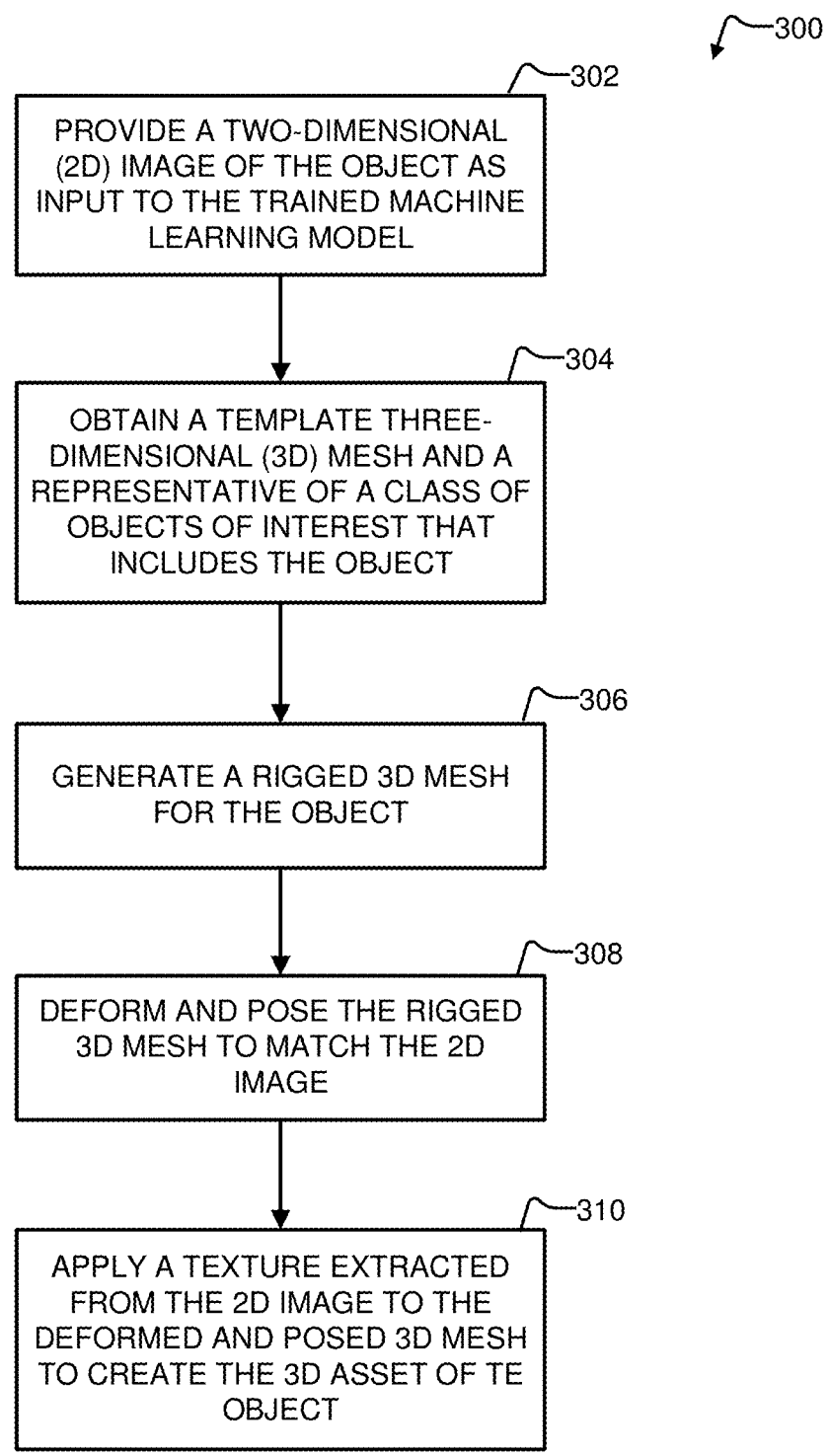
FIG. 3 depicts an example method to generate a 3D asset for an object from a 2D image using a trained machine learning (ML) model, in accordance with some implementations.

FIG. 3 depicts an example method 300 for generation of a 3D asset of an object from a 2D image using a trained machine learning (ML) model, in accordance with some implementations. In some implementations, method 300 can be implemented, for example, on the online assessment platform 102 or virtual experience server 202 described with reference to FIG. 1 and FIG. 2, respectively. In some implementations, some or all of the method 300 can be implemented on one or more client devices 110 and/or 210 as shown in FIGS. 1 and 2, on one or more developer devices 230, or on one or more server device(s) 202, and/or on a combination of developer device(s), server device(s) and client device(s). In described examples, the implementing system includes one or more digital processors or processing circuitry ("processors"), and one or more storage devices (e.g., a datastore 220, data store 108, or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

Method 300 may begin at block 302. At block 302, a two-dimensional (2D) image of an object is provided as input to a trained machine learning model. The 2D image may be retrieved from a data store or be provided as user input by a user. The object may be a representation of an object that is part of the virtual environment, e.g., a biological object such as an animal, a fish, mammal, bird, etc., or an artificial object such as an automobile, plane, etc., that is included in an assessment or virtual experience/environment. The 2D image may include an image of an object that was not previously provided as input to the ML model(s), or may be an image of an object previously provided as input to the ML model(s). In some implementations, the 2D image may be a photograph of a real object. Block 302 may be followed by block 304.

At block 304, a template three-dimensional (3D) mesh associated with an object, and a representative of a class of objects of interest comprising the object, is obtained. In some implementations, a category of the object may be determined based on an image analysis of the provided 2D image. As described earlier, objects and/or characters in virtual environments may be implemented as a 3D model and may include a surface representation used to draw the object/character (also known as a skin or mesh) and a hierarchical set of interconnected bones (also known as a skeleton or rig). The rig may be utilized to animate the character and to simulate motion and action by the object. The 3D model may be represented as a data structure, and one or more parameters of the data structure may be modified to change various properties (attributes) of the object and/or character, e.g., dimensions (height, width, girth, etc.); body type; movement style; number/type of body parts; proportion (e.g., shoulder and hip ratio); head size; etc.

In some implementations, the template 3D mesh is a homeomorphic template mesh. The template 3D mesh may be selected from a set of previously generated and stored, template meshes, and may include both user generated and automatically generated meshes. In some implementations, multiple template meshes may be presented to the user and a template mesh selected based on input received from a user. In some implementations, a plurality of template meshes may be selected for the performance of method 300. Block 304 may be followed by block 306.

At block 306, a rigged 3D mesh for the object is generated using the trained machine learning model and the representative of the class, based on the 2D image and the template 3D mesh. In some implementations, the trained machine learning model may include an artificial neural network (ANN), e.g., a feedforward ANN such as a multilayer perceptron (MLP). In some implementations, the trained machine learning model may include a mesh encoder, an image encoder, and a plurality of mesh decoders that are trained to generate a 3D mesh of an object based on a 2D image of the object.

The machine learning model is trained using a variety of objects and their corresponding geometries, meshes, and images.

In some implementations, an image encoder is utilized to encode the provided 2D image into a shape space vector. The shape space vector may be an n-dimensional vector that is a reduced dimension representation of the provided 2D image. A mesh decoder associated with a category of the object is utilized to decode the shape space vector into the 3D mesh of the object by deforming the template 3D mesh, whereby vertices of the template mesh are adjusted (moved) based on the shape space vector by utilizing a homeomorphic transformation that preserves the topological properties of the template 3D mesh. In some implementations, the 3D mesh for the object generated by deforming the template 3D mesh may be displayed via a user interface.

In some implementations, prior to obtaining the template 3D mesh, the category of the object may be determined based on the 2D image using a trained neural network. Thereafter, the representative of the class of objects of interest may be obtained based on the determined category. In some implementations, image segmentation may be performed to determine a category of the object. In some implementations, the category of the object may be specified based on user input.

In some implementations, one or more textures from the 2D image may be mapped to the 3D mesh of the object, depending on texture information in the 2D image. In some implementations, a semantic segmentation may be performed, and texture information from different portions of the 2D image may be mapped to corresponding portions of the 3D mesh of the object. Block 306 is followed by block 308.

At block 308, a rigged 3D mesh is generated for the object. For example, the template 3D mesh can be associated with a rig that includes a plurality of vertices (joints) of the mesh arranged in space. The rig may include a hierarchical set of interconnected parts (called bones, and which collectively form the skeleton or rig). In such implementations, each vertex of the plurality of vertices is connected to at least one other vertex of the plurality of joints. Block 306 is followed by block 308.

At block 308, the rigged 3D mesh is deformed and posed to match the input 2D image. For example, posing and shape deformation is a decomposed mesh transformation. Posing refers to regression of the mesh skeleton to match the target image. Deformation refers to moving the associated vertices of the mesh to match the target image. In some implementations, only one of posing or deformation may be performed. Posing and deformation is illustrated more fully with reference to FIGS. 4 and 6C-6D.

In driving skeletal deformation for the rigged 3D mesh, a new location for rig placement can be defined as follows:
New Location:

$$v' = \sum_{i \in K} w_i E_i v$$

Where a vertex v belongs to vertex groups $\{V_i\}_{i \in K}$, with weights w_i, and affine transformations $\{E_i\}_{i \in K}$ pose the corresponding bones.

Generally, for deformation, the model predicts the displacement of template vertices, while the regression predicts the translation and rotation that position the mesh to match the camera perspective of the target image. In one implementation, the model consists of 5 linear layers (e.g., 1024, 512, 256, 128, 64) with rectified linear unit (ReLU) activation function on the first four and tanh on the last. The neural net maps a point randomly sampled from M to a vector in $R^3$, so a vector field can be approximated over M by sampling multiple points. A vector u_p at point p represents the predicted displacement from p toward the target surface. Thus, the predicted surface can be generated by acting with the vectors {u_v} on the vertices v of M.

Generally, for posing, the output of the deformation stage is posed using predicted bone affine transformations. For example, the mesh is equipped with a skeleton, which is a collection of "bones" arranged hierarchically. Each bone is posed with a transformation E_i within the 3D affine group. Each v_j is associated with a collection of vertex groups {V_i}, each with weight {w_ji}.

Accordingly, in a single regression step, the model predicts vertex offsets, which is used to deform the template mesh. The deformed template is posed using the predicted bone rotations and translations as described above. The posed deformed template is then rendered to generate a predicted alpha channel, which can be compared to the target alpha image via a loss. The loss can include a descriptor loss, silhouette loss, and/or symmetry loss, defined below.

The descriptor loss can be defined as follows:
Descriptor loss:

$$\sum_{i \in C} Chamf(\text{target\_pc}_i, \text{render\_pc}_i)$$

Where C is the set of descriptor classes, target_pc_i is a randomly sampled point cloud from the mask of the target image for descriptor class i, and render_pc_i is the rendered locations of a point cloud randomly sampled from the surface of the posed deformed mesh belonging to class i. Chamf is the symmetric chamfer distance given by:

$$Chamf(pc_1, pc_2) = \sum_{x \in pc_1} \min_{y \in pc_2} \|x-y\|^2 + \sum_{y \in pc_2} \min_{x \in pc_1} \|x-y\|^2$$

The silhouette loss can be defined as follows:
Silhouette Loss:

$$\mathbb{E}\left[1 - \frac{\|S * S'\|_1}{\|S + S' - S * S'\|_1}\right]$$

Where S represents the ground truth mask; and S' is the predicted mask.

The symmetry loss can be defined as follows:
Symmetry Loss: $\mathbb{E}\|V'-RV'\|_2$ Where R is an operator that reflects V' about the mesh's plane of symmetry.

After comparison based on the loss, block 308 is followed by block 310.

At block 310, a texture extracted from the target image is mapped to the deformed and posed 3D mesh to create the finalized 3D asset. In this block, a UV regressor may be utilized to apply the texture to the deformed and posed mesh corresponding to the object. In some implementations, the UV regressor may be utilized to generate a mapping from vertices of the 3D mesh of the object to the 2D image, wherein the mapping is used to apply a texture to the 3D mesh of the object.

A UV texture image can be directly generated via a deep image prior (DIP) model so that when the deformed mesh is rendered using this texture it matches the color of the target image. The texture can also be encouraged to respect the symmetry of the template and encourage it to inherit some of the finer features of the texture such as eyes and teeth.

Generally, the UV mapping is the 3D modeling process of projecting a 2D image to a 3D model's surface for texture mapping. The letters "U" and "V" can denote the axes of the 2D texture where "X," "Y," and "Z" denote the axes of the 3D object in model space. Vertices may be assigned UV coordinates by tracing which pixels in the depth image project down to which vertices in the 3D model. These coordinates may indicate the pixel location in the texture image to which a vertex corresponds. For example, if the texture image is of size (256, 512) and a vertex projects to the pixel at (112, 234), the UV coordinates for that vertex are (112/256, 234/512)=(0.4375, 0.457).

In some implementations, a machine learning model may utilize the two-dimensional image of the object and the corresponding deformed and posed mesh to generate a UV mapping from vertices of the deformed mesh to the second two-dimensional image for the object. The ML model may be a trained statistical model that is fine-tuned to perform fine-grained semantic segmentation on sets of predefined descriptors, e.g., a dataset including animals, mammals, or fish. These descriptors may be used to guide a regression through UV space. In some embodiments, the UV regressor may attempt to "cast a net" over a given image in UV space. Instead of warping the image to fit the mesh, the ML model may learn how to project the mesh onto the image. The input image may be the same image used for 3D reconstruction, so this regressor may be run as part of an automated 3D reconstruction pipeline. In some embodiments any image with a sufficiently large portion of the animal visible may be usable, so multiple textures may be applied to the same mesh.

In some embodiments, the training of the UV regressor may include training a network to learn a map from the mesh surface to the image domain using a descriptor loss (defined above). The input image may be processed by a description net to obtain each pixel's descriptor. At each iteration, points for each descriptor class may be sampled from the mesh surface and from the target image. The network may be used to map the sampled mesh points into the UV space of the image. The regression may use AdamOptimizer (e.g., with learning rate 0.0001) to minimize the descriptor loss. The network may be pre-trained using a mean-squared loss with the UV coordinates generated from a side-view perspective projection of the mesh. The UV regressor may be trained using a loss function that includes a descriptor loss, silhouette loss, and symmetry loss.

In other embodiments, in a single regression step, the target image can be fed into a deep image prior (DIP) model, which predicts an RGB image in UV space. The UV mapping is inherited from the template mesh, so it can be used to texture the mesh. The textured mesh is then rendered, which is compared to the target image via a loss function, such as a color loss function defined here:

Color Loss: $L_{color}=\|I-I'\|_2$

Just as a map from template mesh surface to a target mesh surface can be generated, a map from a template mesh surface to a 2D image may be generated for the purposes of texturing. In some implementations/embodiments, a decoder for texturing may include five fully-connected layers with output sizes of 1024, 512, 256, 128, and 2, respectively. Each layer may use a ReLU activation function except the final layer, which may have no activation.

In some embodiments, the texturing is most information-rich with a target image that contains as most of the object in question as possible (e.g., a head-on view of an animal has less information from which to texture the mesh than a side view). Better results may be produced when the images contain animals in an approximately side-view perspective than for other perspectives. For example, the model may be primed by pretraining it using a mean-squared loss with the UV coordinates generated from a side-view perspective projection of the mesh.

However, it may be unlikely that a perfect side-view target image is received, and because at every iteration a map is learned from the entire surface of the mesh to the target image, one side will end up matching the image better than the other. It follows that when trying to texture the mesh, the textures on either side of the plane of symmetry may be inconsistent and unrealistic. To solve this, at the conclusion of the regression, the descriptor loss for each side of the mesh is computed separately, and the side with the smallest value is utilized as the basis for the UV map for the entire mesh by reflection.

In some implementations, user input may be used to refine and/or adjust any of the above blocks. For example, in at least one implementation, a user interface that includes the 3D asset (or a stage of creation of the 3D asset) may be displayed. A user may adjust one or more parameters or attributes through the user interface. Thereafter, the user input may be utilized to adjust at least one graphical feature of the 3D asset.

As described above, a 3D asset may be generated using the teachings herein. The 3D asset may also be used in animation, such as 3D animation in a virtual experience and/or assessment. One or more animations associated with the 3D asset may be predefined such that each template animation includes movement of two or more of the plurality of vertices to simulate motion of the underlying object. Utilization of a homeomorphic template 3D mesh enables reuse of the template animation in the generated 3D asset of the object, which is obtained by deforming the template 3D mesh. Additionally, a sequence of images can also be used to determine stages/poses of animation of the 3D asset.

In some implementations, at least one object animation for the object may be generated that is based on the 3D mesh for the object and the one or more template animations associated with the template 3D mesh that includes movement of the same two or more vertices as in a corresponding template animation of the one or more (predefined) template animations.

Figure 4:
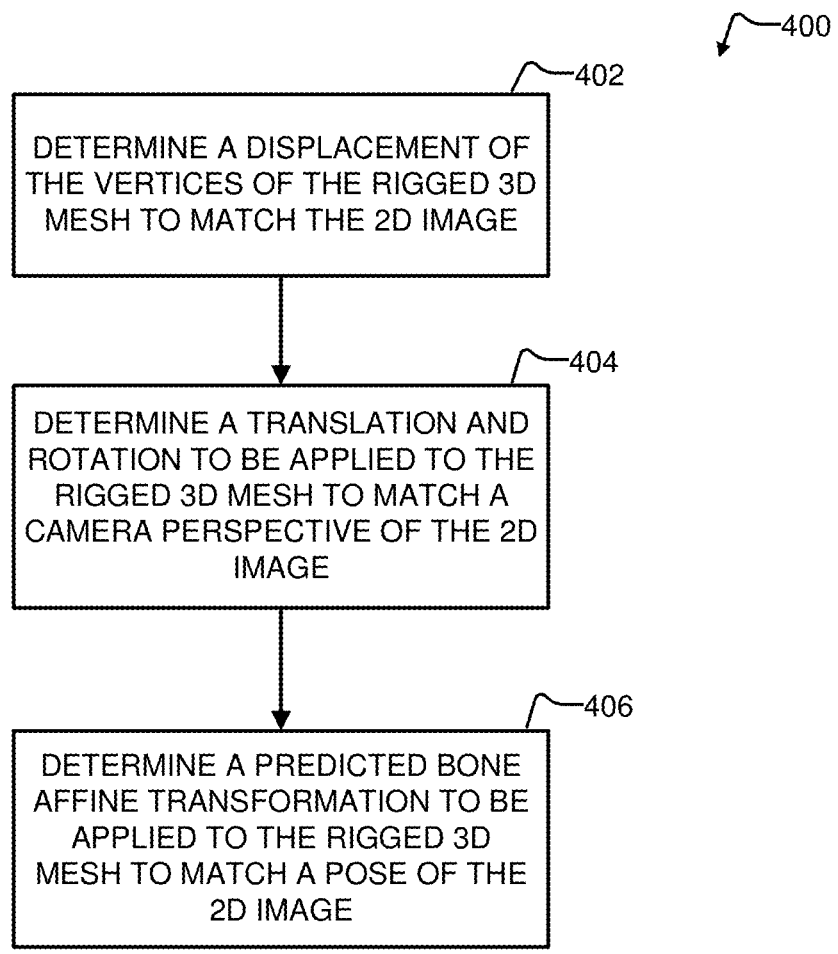
FIG. 4 is a flowchart illustrating an example method to deform and pose a rigged 3D mesh to match a target image, in accordance with some implementations.

FIG. 4 is a flowchart illustrating an example method of deforming and posing a rigged 3D mesh to match a target image, in accordance with some implementations.

In some implementations, method 400 can be implemented, for example, on a server 202 described with reference to FIG. 2. In some implementations, some or all of the method 400 can be implemented on one or more client devices 210 as shown in FIG. 2, on one or more developer devices 230, or on one or more server device(s) 202, and/or on a combination of developer device(s), server device(s) and client device(s). In described examples, the implementing system includes one or more digital processors or processing circuitry ("processors"), and one or more storage devices (e.g., a datastore 220 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., an accuracy of 3D mesh generation of objects falling below a threshold, new categories of object(s) added to the assessment platform or the gaming platform, a predetermined time period having expired since the last performance of method 400, and/or one or more other conditions occurring which can be specified in settings read by the method.

Method 400 may begin at block 402. At block 402, a displacement of the vertices of the rigged 3D mesh to match the 2D image is determined. For example, the model predicts the displacement of template vertices, as described above with reference to FIG. 3. Block 402 may be followed by block 404.

At block 404, a translation and/or rotation to be applied to the rigged 3D mesh to match a camera perspective of the 2D image are determined. For example, a regression predicts the translation and rotation that position the mesh to match the camera perspective with which the target image was captured, as described above with reference to FIG. 3. Block 404 may be followed by block 406.

At block 406, a predicted bone affine transformation to be applied to the rigged 3D mesh to match a pose of the 2D image are determined. For example, the mesh is equipped with a skeleton, which is a collection of "bones" arranged hierarchically. Each bone is posed with a transformation $E\_i$ within the 3D affine group. Each $v\_j$ is associated with a collection of vertex groups $\{V\_i\}$, each with weight $\{w\_{ji}\}$.

Accordingly, in a single regression step, the model predicts vertex offsets, which is used to deform the template mesh. The deformed template is posed using the predicted bone rotations and translations as described above.

Hereinafter, sequences of images are presented as examples of image segmentation, and regression to form a 3D asset from the input 2D target image.

Figure 5:
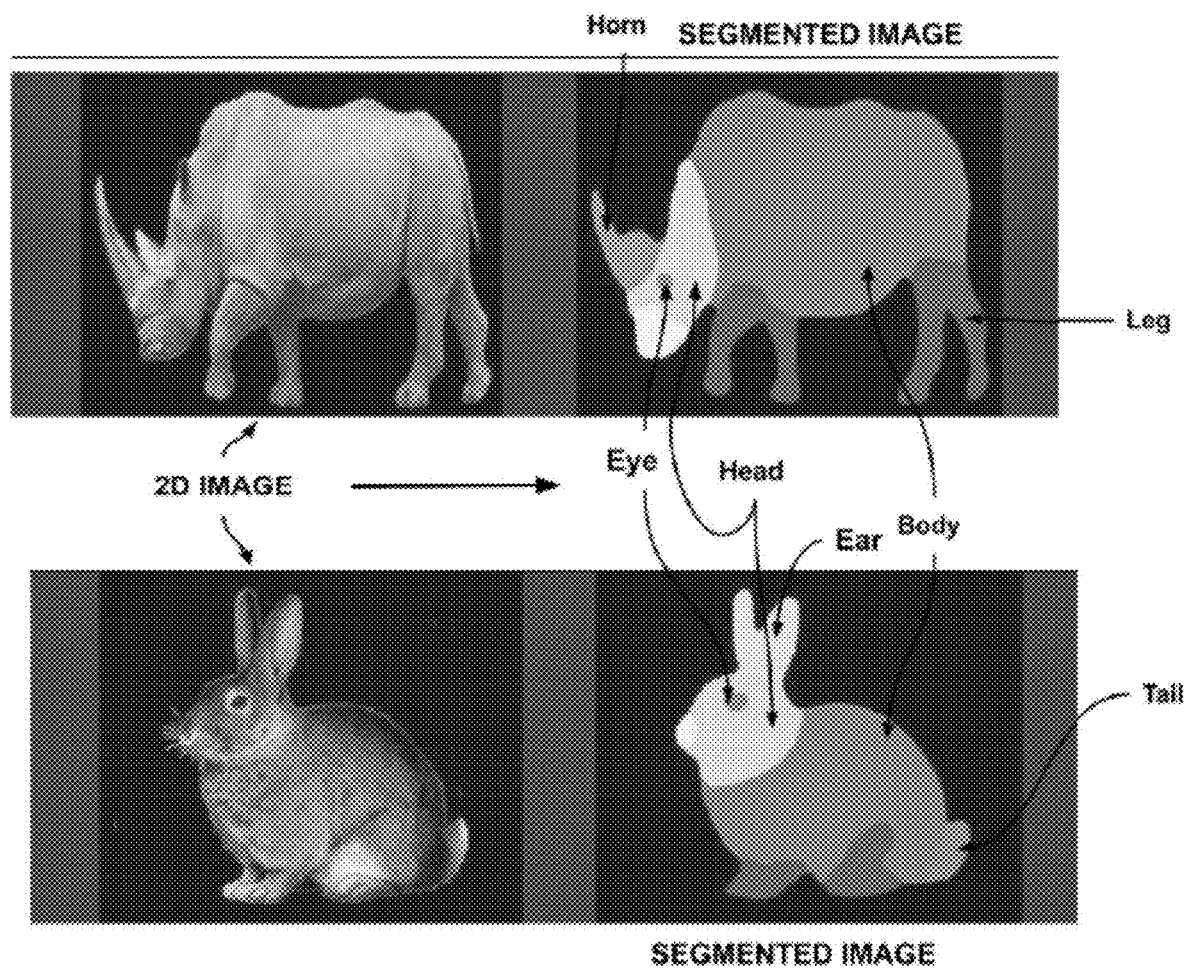
FIG. 5 depicts an example of segmentation of 2D images for classification, in accordance with some implementations.

FIG. 5 depicts an example of segmentation of 2D images for classification, in accordance with some implementations.

Fine-grained semantic segmentation may be performed on a set of predefined descriptors to determine particular portions of an object and to classify the object, determine a category type, etc. In some implementations, a pre-trained model may be utilized to perform semantic segmentation. Suitable modifications may be made to specify output classes to match a category of object and/or biological asset. For example, the number of output classes of a pretrained model may be changed to match the number of descriptors (e.g., 8 for mammals, or 3 for fish) and trained with a learning rate of 1E-4. In this illustrative example, the left side of FIG. 5 depicts the input image, and the right side shows results from the trained ML model.

In some implementations, a defined descriptor set for an example set of an object category of mammals may include eye, head, leg, muzzle, ear, tail, horn, and body, and a defined descriptor set for an object category of fish may include eye, body, and fin.

Figure 6A:
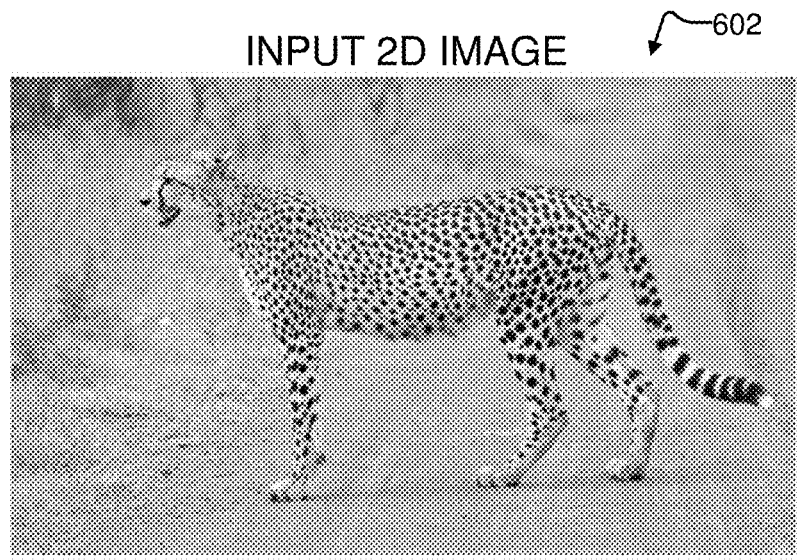
FIG. 6A depicts an example 2D target image, in accordance with some implementations.

FIG. 6A depicts an example 2D target image, in accordance with some implementations. For example, the input 2D target image 602 may be input into the trained machine learning model described above, and the defined descriptor set may be used for segmentation of, in this example, a mammal (e.g., cheetah). In this example, a template 3D mesh representative of a class of objects of interest (e.g., the cheetah/mammal) is obtained.

Figure 6B:
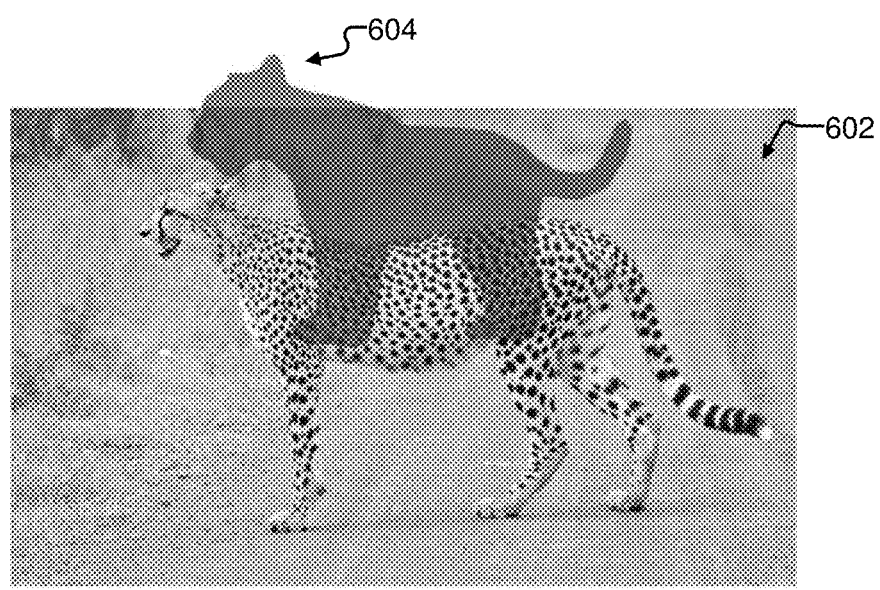
FIG. 6B depicts posing and deformation regression, in accordance with some implementations.

FIG. 6B depicts posing and deformation regression, in accordance with some implementations. As shown, the trained machine learning model may obtain a template 3D mesh 604, as described above. The rigged 3D mesh 604 may be deformed and posed to match the input image 602.

Figure 6C:
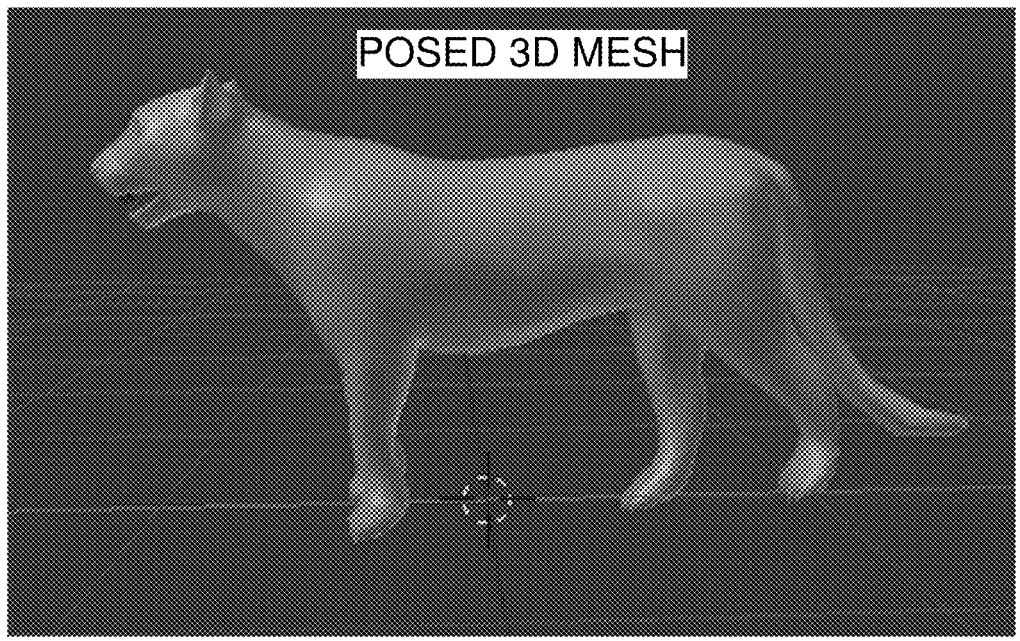
FIG. 6C depicts a posed 3D mesh, in accordance with some implementations.
Figure 6D:
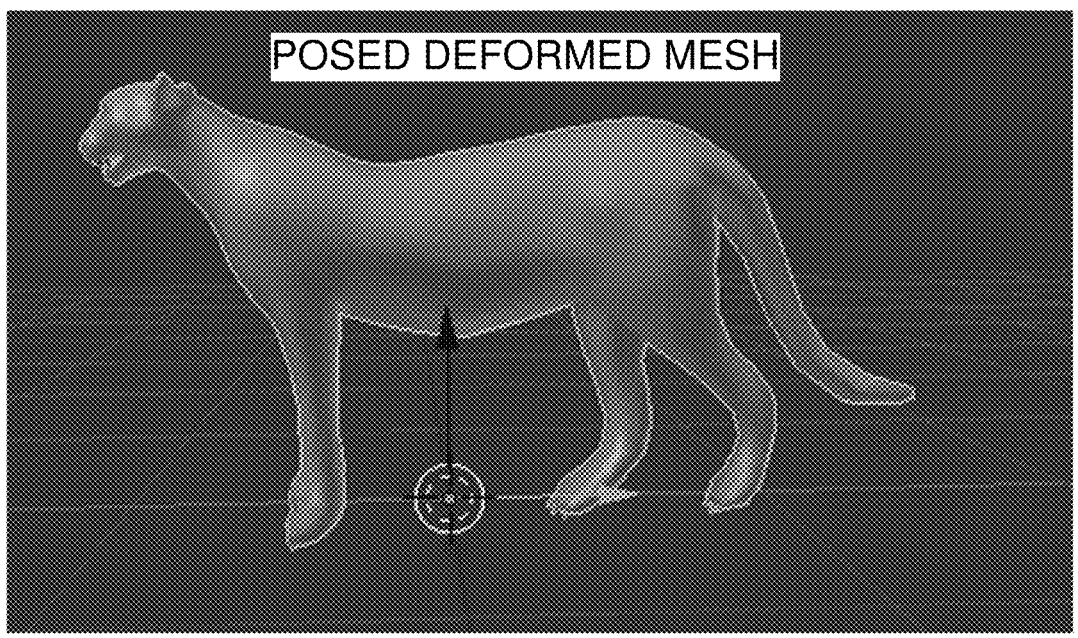
FIG. 6D depicts a posed deformed 3D mesh, in accordance with some implementations.
Figure 6E:
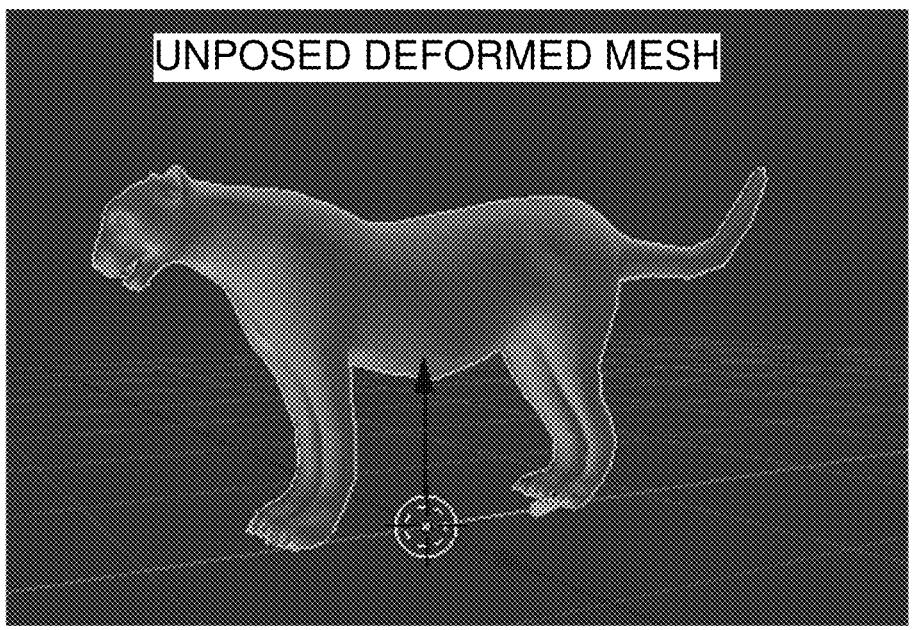
FIG. 6E depicts an unposed deformed 3D mesh, in accordance with some implementations.

FIG. 6C depicts a posed 3D mesh. As seen in FIG. 6C, the mesh 604 of FIG. 6B has been adjusted to match the pose of the animal in image 602. For example, the upward pointing tail of 604 in FIG. 6B is updated to be longer and downward pointing in the posed 3D mesh of FIG. FIG. 6D depicts a posed deformed 3D mesh. As seen in FIG. 6D, the head and torso of the model is updated to match that of the animal in input 2D image 602. FIG. 6E depicts an unposed deformed 3D mesh, in accordance with some implementations. In FIG. 6E, the 3D mesh is deformed, as seen by the head and torso, but not posed as seen by the short, upward pointing tail that does not match the input 2D image 602. As shown in FIGS. 6C-6E, the described techniques can adjust the rigged 3D mesh by deforming and/or posing to match the target image 602 in multiple axes.

Figure 6F:
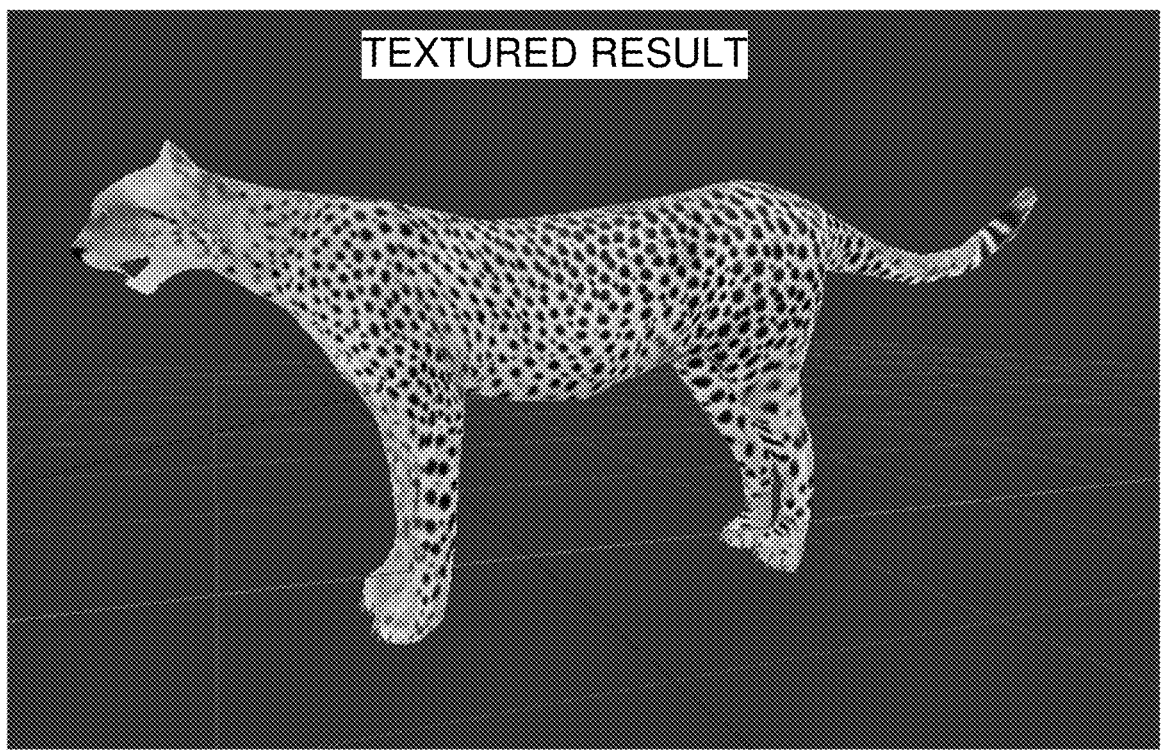
FIG. 6F depicts an example textured 3D mesh, in accordance with some implementations.

FIG. 6F depicts an example textured 3D mesh, in accordance with some implementations. As shown, the trained neural network has mapped a texture extracted from the 2D image to the deformed 3D mesh to create the 3D asset.

Figure 6G:
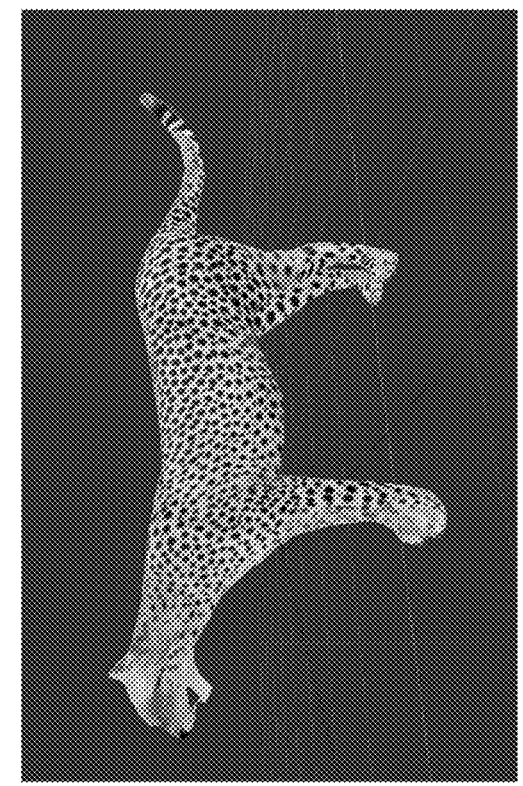
FIG. 6G depicts an example 2D target image and a corresponding generated 3D asset, in accordance with some implementations.
Figure 6G:

FIG. 6G depicts an example 2D target image and resulting 3D asset, in accordance with some implementations. As shown, machine learning techniques as described with reference to FIGS. 3 and 4 are applied to utilize the input 2D image 602 to generate a 3D asset. The 3D asset was formed automatically, based on the trained machine learning models described in detail herein-above. Furthermore, if a sequence of 2D input images are provided as input, several poses of the 3D asset may be stored and used in generation of a realistic 3D animation, for example, through manipulation of bone and joints of the rigged 3D mesh embedded in the 3D asset.

Figure 7:
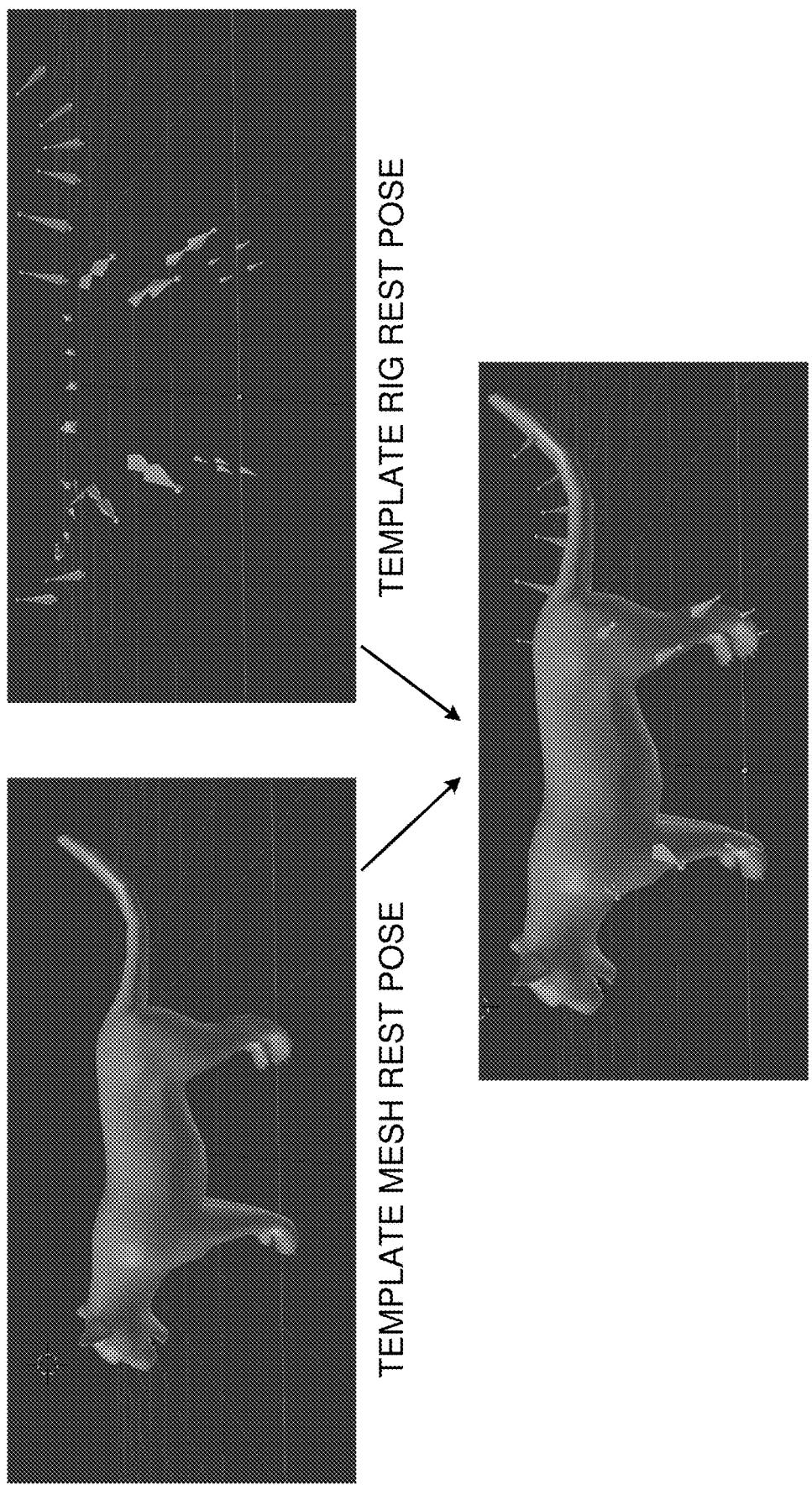
FIG. 7 depicts an example bone and joint distribution of the transformation, in accordance with some implementations.

FIG. 7 depicts an example bone and joint distribution of the transformation of FIGS. 6A-6G, in accordance with some implementations. For example, the template 3D mesh (left side of FIG. 7) can be associated with a rig (right side of FIG. 7) that includes a plurality of vertices (joints) of the mesh arranged in space. The rig may include a hierarchical set of interconnected parts (called bones, and which collectively form the skeleton or rig). In such implementations, each vertex of the plurality of vertices is connected to at least one other vertex of the plurality of joints and associated with the 3D mesh (bottom of FIG. 7).

Hereinafter, a more detailed description of various computing devices that may be used to implement different devices illustrated in FIGS. 1-2 is provided with reference to FIG. 8.

Figure 8:
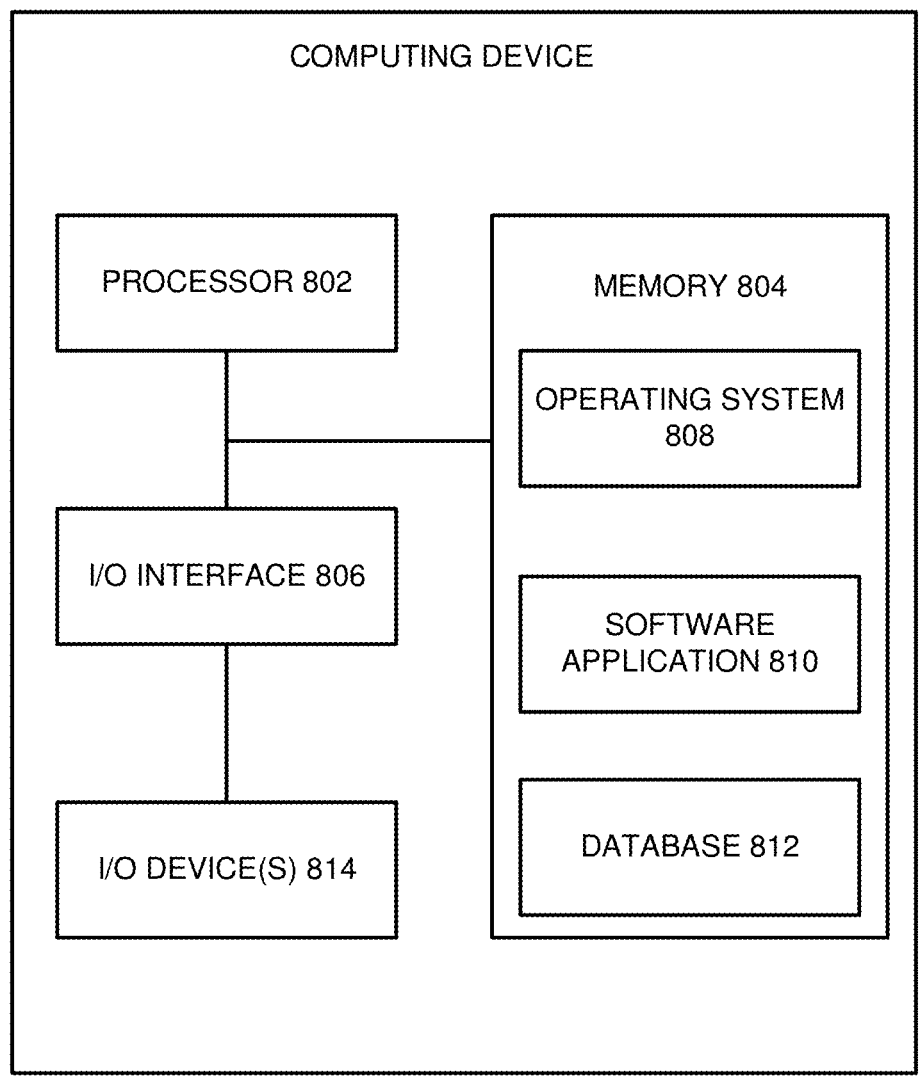
FIG. 8 is a block diagram illustrating an example computing device, in accordance with some implementations.

FIG. 8 is a block diagram of an example computing device 800 which may be used to implement one or more features described herein, in accordance with some implementations. In one example, device 800 may be used to implement a computer device, (e.g., 102, 110, 202, 210, and/or 230 of FIG. 1 and FIG. 2), and perform appropriate operations as described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, software application 810 and associated data 812. In some implementations, the applications 810 can include instructions that enable processor 802 to perform the functions described herein, e.g., some or all of the methods of FIGS. 3, 4, and 5. Software application 810 may include one or more machine learning models that can be utilized to create a 3D asset for an object based on a 2D image of the object, a 3D mesh, and a representative of a class of objects of interest that includes the object. In some implementations, the machine learning models may include a first model that generates the 3D asset and a second machine learning model that performs deformation and/or posing of the generated 3D asset. In some implementations, software application 810 may include instructions to extract a texture from an input 2D image and apply it to a 3D mesh. In some implementations, software application 810 may generate and/or display a user interface; may receive user input to adjust the generated 3D asset; and may perform adjustment of the generated 3D asset based on the user input. In some implementations, one or more portions of software application 810 may be implemented in dedicated hardware such as an application-specific integrated circuit (ASIC), a programmable logic device (PLD), a field-programmable gate array (FPGA), a machine learning processor, etc. In some implementations, one or more portions of software application 810 may be implemented in general purpose processors, such as a central processing unit (CPU) or a graphics processing unit (GPU). In various implementations, suitable combinations of dedicated and/or general purpose processing hardware may be used to implement software application 810.

For example, software application 810 stored in memory 804 can include instructions for generating 3D assets from 2D images of objects, for training machine learning models, to produce 3D meshes, to create rigged meshes, to perform regression, and/or other functionality. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 500, 600, and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to generate a three-dimensional (3D) asset of an object using a trained machine learning model, the method comprising:
providing a two-dimensional (2D) image of the object as input to the trained machine learning model, wherein the trained machine learning model is a first trained machine learning model;
obtaining a template three-dimensional (3D) mesh and a representative of a class of objects of interest that includes the object;
generating, using the trained machine learning model, based on the template 3D mesh and the representative of the class, a rigged 3D mesh for the object;
deforming and posing the rigged 3D mesh to match the 2D image, wherein the deforming and posing comprises:
generating, using a second trained machine learning model, a vector field for the rigged 3D mesh based on the 2D image and the rigged 3D mesh of the object;
predicting a plurality of bone rotations and transformations of the rigged 3D mesh using the vector field; and
generating an alpha image based on the predicted plurality of bone rotations and transformations; and
applying a texture extracted from the 2D image to the deformed and posed 3D mesh to create the 3D asset of the object.

2. The computer-implemented method of claim 1, further comprising:
displaying a user interface that includes the 3D asset; and
receiving user input to adjust at least one graphical feature of the 3D asset.

3. The computer-implemented method of claim 1, further comprising:
iteratively generating rigged 3D meshes based on a sequence of 2D images of the object; and
generating an animation of the 3D asset based on the iteratively generated 3D meshes.

4. The computer-implemented method of claim 1, further comprising:
determining a category of the object based on the 2D image using a trained neural network, wherein the obtaining the representative of the class of objects of interest is based on the determined category.

5. The computer-implemented method of claim 1, wherein applying the texture comprises:
generating a mapping from two or more vertices of the rigged 3D mesh of the object to the 2D image based on the 2D image and the rigged 3D mesh of the object, wherein the mapping is used to apply the texture to the deformed and posed 3D mesh of the object.

6. The method of claim 5, wherein the generating the mapping is performed by a bidimensional (UV) regressor trained using a loss function that includes one or more of: a descriptor loss based on a Chamfer distance or a color loss.

7. The method of claim 1, further comprising comparing the alpha image to the 2D image using a loss function that includes one or more of: a descriptor loss, a silhouette loss, or a symmetry loss.

8. The computer-implemented method of claim 1, wherein the deforming and posing further comprises one or more of:
determining a displacement of the vertices of the rigged 3D mesh to match the 2D image;
determining one or more of a translation or rotation to be applied to the rigged 3D mesh to match the 2D image; or
determining a predicted bone affine transformation to be applied to the rigged 3D mesh to match a pose of the object in the 2D image.

9. A system, comprising:
a memory with instructions stored thereon; and
a processing device, coupled to the memory, the processing device configured to access the memory, wherein the instructions when executed by the processing device, cause the processing device to perform operations including:
obtaining a two-dimensional (2D) image of an object;
obtaining a template three-dimensional (3D) mesh and a representative of a class of objects of interest that includes the object;
generating, using a trained machine learning model and based on the template 3D mesh and the representative of the class, a rigged 3D mesh for the object, wherein the trained machine learning model is a first trained machine learning model;
deforming the rigged 3D mesh to match the 2D image, wherein the deforming comprises:
generating, using a second trained machine learning model, a vector field for the rigged 3D mesh based on the 2D image and the rigged 3D mesh of the object;
predicting a plurality of bone rotations and transformations of the rigged 3D mesh using the vector field; and
generating an alpha image based on the predicted plurality of bone rotations and transformations; and
applying a texture extracted from the 2D image to the deformed and posed 3D mesh to create a 3D asset of the object.

10. The system of claim 9, wherein the operations further comprise:
displaying a user interface that includes the 3D asset; and
receiving user input to adjust at least one graphical feature of the 3D asset.

11. The system of claim 9, wherein the operations further comprise:
iteratively generating rigged 3D meshes based on a sequence of 2D images of the object; and
generating an animation of the 3D asset based on the iteratively generated rigged 3D meshes.

12. The system of claim 9, wherein the operations further comprise:
determining a category of the object based on the 2D image using a trained neural network, wherein the obtaining the representative of the class of objects of interest is based on the determined category.

13. The system of claim 9, wherein applying the texture comprises:
generating a mapping from two or more vertices of the rigged 3D mesh of the object to the 2D image based on the 2D image and the rigged 3D mesh of the object, wherein the mapping is used to apply the texture to the deformed 3D mesh of the object.

14. The system of claim 9, wherein the operations further comprise comparing the alpha image to the 2D image using a loss function that includes one or more of: a descriptor loss, a silhouette loss, or a symmetry loss.

15. The system of claim 9, wherein the deforming and posing further comprises one or more of:
   determining a displacement of the vertices of the rigged 3D mesh to match the 2D image;
   determining one or more of a translation or rotation to be applied to the rigged 3D mesh to match the 2D image; or
   determining a predicted bone affine transformation to be applied to the rigged 3D mesh to match a pose of the object in the 2D image.

16. A non-transitory computer-readable medium comprising instructions that, responsive to execution by a processing device, causes the processing device to perform operations comprising:
   providing a two-dimensional (2D) image of an object as input to a trained machine learning model, wherein the trained machine learning model is a first trained machine learning model;
   obtaining a template three-dimensional (3D) mesh and a representative of a class of objects of interest that includes the object;
   generating, using the trained machine learning model, based on the template 3D mesh and the representative of the class, a rigged 3D mesh for the object;
   deforming and posing the rigged 3D mesh to match the 2D image, wherein the deforming and posing comprises:
      generating, using a second trained machine learning model, a vector field for the rigged 3D mesh based on the 2D image and the rigged 3D mesh of the object;
      predicting a plurality of bone rotations and transformations of the rigged 3D mesh using the vector field; and
      generating an alpha image based on the predicted plurality of bone rotations and transformations; and
   applying a texture extracted from the 2D image to the deformed and posed 3D mesh to create a 3D asset of the object.

17. The non-transitory computer-readable medium of claim 16, wherein applying the texture comprises:
   generating, using a bidimensional (UV) regressor, a mapping from two or more vertices of the rigged 3D mesh of the object to the 2D image based on the 2D image and the rigged 3D mesh of the object, wherein the mapping is used to apply the texture to the deformed and posed 3D mesh of the object.

18. The non-transitory computer-readable medium of claim 16, wherein the deforming and posing further comprises one or more of:
   determining a displacement of the vertices of the rigged 3D mesh to match the 2D image;
   determining one or more of a translation or rotation to be applied to the rigged 3D mesh to match the 2D image; or
   determining a predicted bone affine transformation to be applied to the rigged 3D mesh to match a pose of the object in the 2D image.

* * * * *